United States Patent Office 2,792,662
Patented May 21, 1957

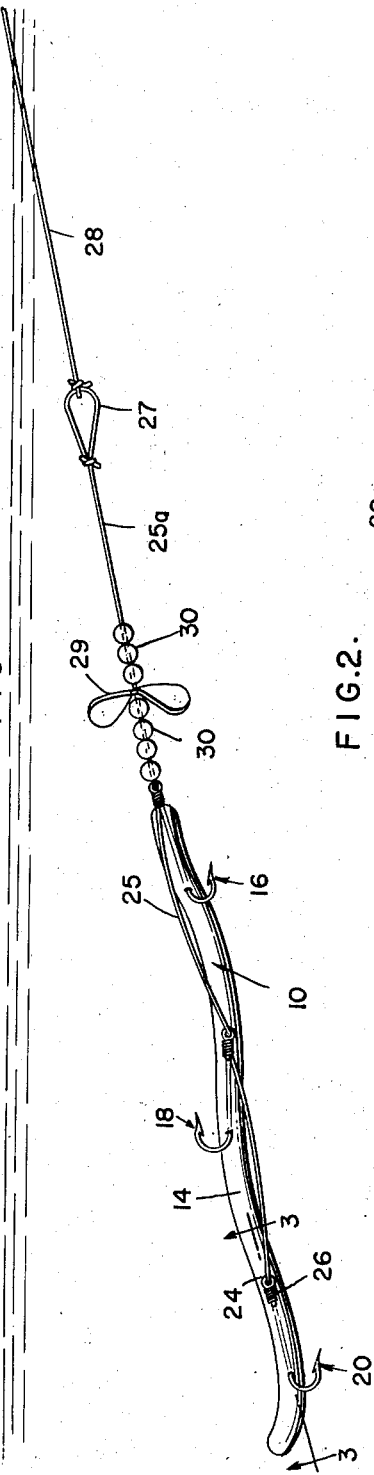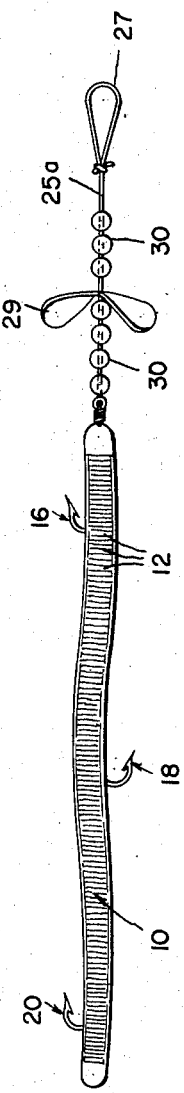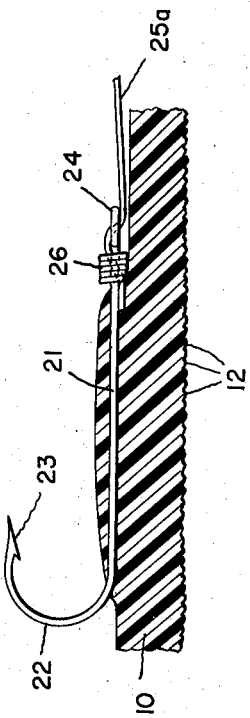

2,792,662

FISHING LURE

Willard E. Norton, Marion, Ind.

Application September 20, 1955, Serial No. 535,409

4 Claims. (Cl. 43—42.24)

This invention relates to fishing apparatus and is directed particularly to improvements in artificial lures.

In the manufacture of artificial fishing lures, the maker or designer strives to produce a lure, usually in the form of an insect or small animal or some other natural body, with as close or near resemblance to the natural body as possible so that when the lure is dropped into and drawn through a body of water in which there are game fish, the fish will mistake the lure for such natural object and rise to the same, particularly if such object is in imitation of a bug or fly or other product of nature which is their natural food.

In addition to striving to make the lure look as much like a natural food to the fish as possible, the maker of the lure also strives to form the lure so that when it is drawn through the water it will have movements characteristic of the particular insect or animal which it is intended to represent, and it is well known that certain game fish are readily excited by such movements and will quickly attack the object.

It is a particular object of the present invention, in view of the foregoing, to provide a new and novel artificial fishing lure which has the above described desirable characteristics so that the lure will be effective in attracting fish and causing them to take the same and thereby be caught on the hook devices concealed or partially concealed therein.

A well known and popular natural bait for fishing is a salt marsh worm known as a "blood worm." While these animals are very good for attracting fish, they are rather unpleasant to handle and put on a hook. Lady fishermen particularly dislike very much to handle the blood worms, particularly where it becomes necessary to sever them into several sections for application to a hook.

In view of the foregoing, a further and more specific object of the invention is to provide a new and novel artificial lure which comprises a soft bodied imitation or reproduction of the blood worm, with a plurality or gangs of joined-together hooks partially embedded therein in a novel manner whereby the worm will be held more or less in an elongated or straightened-out condition which, when the lure is drawn through the water, will cause it to assume undulatory or sinuous movements such as might be expected from a live animal in a like situation.

A further object of the invention is to provide an artificial fishing lure which comprises a soft plastic reproduction of a worm, particularly a blood worm, which is tinted to have the same appearance or color as a blood worm and which also has one side of the body ribbed in the same manner as the natural worm and in which a number of hooks are partially embedded along the length of the worm and joined together in such a manner that when anyone of the hooks is taken by a fish, the pull or strain will not be applied to the artificial or imitation worm, but will be transmitted directly through a leader to the fishing line.

Another object of the invention is to provide a truly all-purpose lure which is equally effective when used for trolling, casting, spinning or cane pole spatting, wherein an imitation of a blood worm or night crawler is employed which is so formed and attached to the hooks as to withstand rough handling and be unaffected by heat or cold.

It is also an object of the invention to provide an artificial lure in the form of a blood worm or night crawler wherein a number of joined-together hooks are inserted or embedded in such a way as to avoid the revolving of the lure and the twisting of the line when the lure is drawn through the water. This manner of placing the hooks in the lure involves the positioning of one hook in a novel position at the head end of the worm whereby such twisting of the line is prevented from taking place.

It is another object of the present invention to provide an artificial lure embodying a resilient plastic member in the form of a blood worm or night crawler, having associated therewith two or more hooks, wherein the hooks are embedded through the major portion of the shanks in the member and joined together by a flexible leader on the outside of the member in such a way as to have a certain amount of slack whereby when the lure is grasped by a fish the slack in the leader portions between the hooks will permit the fish to stretch the member slightly to give the feeling of a live bait, such as a worm or the like, before there is any material degree of resistance. This has the effect of first deceiving the fish in believing that the lure is alive and, secondly, in giving the fisherman an opportunity or time to set the hook after he feels the lure taken by the fish.

Other objects and advantages of the invention will become apparent as the description of the same proceeds and the invention will be best understood from a consideration of the following detail description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Fig. 1 is a view in perspective illustrating the lure of the present invention showing approximately the form assumed by the same as it is being drawn through the water;

Fig. 2 is a view in plan of the lure, showing the hooks on the underside thereof; and Fig. 3 is a partial section taken substantially on the line 3—3 of Fig. 1 and on an enlarged scale.

Referring now more particularly to the drawing, the numeral 10 generally designates the body of the worm forming part of the artificial lure. This figure may represent any one of the different types of worms which are used for fishing, such as the well known blood worms or the more common earth worm or night crawler. In making reference hereinafter to the animal, the use of the word "worm" will be understood to apply to any one of these worm types.

The body of the worm 10 is of substantial length and is formed, preferably by molding, of a suitable soft, flexible elastic material which will have approximately the same degree of resiliency and the same feel to the touch as a natural worm. Such a body having these characteristics may be formed of a soft synthetic resin plastic which can be colored to imitate the color of the worm. In making this synthetic resin plastic body a mold may first be produced by using the natural worm so as to obtain therein impressions of the different peculiarities of the surface formation of the worm. For example, it will be seen particularly in Fig. 2 that the side of the worm shown has throughout the length or substantially the entire length thereof a multiplicity of transverse ribs 12 which the natural animal has, while the opposite side or surface of the animal is smooth, as indicated at 14.

The numerals 16, 18 and 20 designate three barbed hooks which are fixed to the body of the worm in the manner about to be described. Each of these hooks embodies the conventional shank portion 21, the bill 22, having the barbed point or tip 23 at one end while at the opposite end the shank is formed in the conventional eye 24.

In the present lure, preference is had in connection with the hooks employed, for hooks having a long shank and a gold surface or plating as it has been found that this type and color for the hooks is most effective in association with the worm to which the hooks are attached.

The hooks are coupled together in a gang by means of a leader 25. This leader is threaded through the eyes 24 of the hooks and the latter are equidistantly spaced on the leader and the leader is bound to the shank of each hook adjacent to the eye by a suitable wrapping 26.

The hook 16 is the uppermost one of the gang and a substantial length of the leader material extends beyond the eye 24 of this uppermost hook where it terminates in a loop 27 by means of which the leader may be attached to the fishing line 28.

In the portion of the leader designated 25ᵃ between the loop 27 and the eye of the uppermost hook 16, there is mounted thereon a two-bladed propeller type spinner 29 of the conventional form, and above and below the spinner the leader has thereon a number of colored beads 30.

In attaching the hooks to the worm, the uppermost hook 16 has the point thereof inserted directly in the head end of the worm and the point is thrust longitudinally through the body for a distance approximating the length of the hook shank and the eye of the hook is then directed outwardly so that most of the bill portion 22 and the barbed tip will be exposed.

At about midway of the length of the worm the second hook 18 has the point thereof inserted into the body of the worm on the same side as that from which the bill of the hook 16 projects and here also the point is run through the length of the body a distance substantially equal to the length of the hook shank and the point is brought out in the same manner as described in connection with the hook 16.

The end or bottom hook 20 is also attached like the other two hooks, the point being run into the body on the same side as that from which the points of the other hooks project and after being run through the body to substantially the length of the hook shank the point is brought out to be exposed as shown.

All of the hooks have the points thereof projecting from the smooth underside 14 of the worm as illustrated and they are attached so that the leader material joining them together will have some slack, thereby permitting a free movement of the body of the artificial worm as the lure is drawn through the water.

The leader 25 is preferably a mono-filament leader, this being considered to be somewhat better in use than a wire leader since the mono-filament leader allows the artificial worm to wiggle in a very lifelike manner. By inserting the uppermost or back hook 16 to the extreme end of the artificial night crawler in the manner illustrated and described, any fish following the lure, whether large or small, will get hooked if he nips at the tail of the worm. The soft elastic body of the lure causes the same to have a very lifelike movement when drawn through the water, whether it be drawn at a fast rate or a slow rate, and, as previously stated, the particular manner in which the hooks are attached to the body of the worm permits the same to have a lifelike wiggle in the water without revolving and causing the fishing line to become twisted.

Another feature which adds to the attractiveness of the lure is the small spinner which is attached to the leader at the leading or head end of the worm, as a result of which when the lure is settling in the water after a cast, the spinner will revolve and create an attraction which is calculated to provoke a great percentage of the fish to strike at the lure.

In connection with the beads 30, preference is had for those of round form since it is found that round beads of relatively small size, approximately 4 mm., are less likely to collect debris along the water edge and also add to the attractiveness of the lure.

I claim:

1. An artificial fishing lure, comprising an elongate body of a soft flexible synthetic resin plastic having the form, markings, coloring and feel of a live worm, at least two spaced hooks each having a shank, an eye at one end of each shank and a pointed bill joining the other end of the shank, each shank being embedded for approximately its full length in and extending lengthwise of the body just to one side of the exterior surface of the body, and the body having a portion extending beyond the bill part of one hook of a length materially greater than the length of the hook to undulate freely when drawn through the water, and a leader connected to the eyes of the hooks.

2. The invention according to claim 1, wherein the shank of one hook is positioned at one end of the body with the eye extending from said end substantially in the line of the longitudinal center of the body, a second hook having its shank portion embedded longitudinally of the body substantially midway of the ends of the body and a third hook having its shank embedded longitudinally in the body adjacent to the opposite end of the latter, said leader forming a continuous connection between the eyes and being secured in the eyes of the hooks, and the leader material in the portions lying between the body attached hooks having a degree of slack whereby the body may have free wriggling movement when drawn through the water.

3. An artificial fishing lure, comprising an elongate body of a soft flexible and elastic plastic having the form of a live worm, a plurality of separate and individual small size fishing hooks each having a shank, eye and pointed bill, said hooks being positioned in substantially aligned relation with a substantial portion of the shanks thereof embedded in and extending longitudinally of the body and spaced apart along the length thereof, one hook being positioned with the eye thereof projecting from one end of the body, a leader passing through and secured to the eyes of the hooks and extending a substantial distance beyond the eye of said one hook and terminating in a means for attachment to a fish line, the spacing between the hooks being not less than the lengths of the hooks whereby the body is free to bend and flex in the drawing of the lure through the water, and the leader in the portions between the hooks having a degree of slack whereby said bending and flexing is permitted, the leader including a spinner between said means and the last stated eye, and spacer members on the leader upon opposite sides of the spinner.

4. An artificial fishing lure, comprising an elongate body of a soft flexible and elastic plastic having the form of a live worm, a plurality of separate and individual small size fishing hooks each having a shank, eye and pointed bill, said hooks being positioned in substantially aligned relation with a substantial portion of the shanks thereof embedded in and extending longitudinally of the body and spaced apart along the length thereof, one hook being positioned with the eye thereof projecting from one end of the body, a leader passing through and secured to the eyes of the hooks and extending a substantial distance beyond the eye of said one hook and terminating in a means for attachment to a fish line, the spacing between the hooks being not less than the lengths of the hooks whereby the body is free to bend and flex in the drawing of the lure through water, and the leader in the portions between the hooks having a degree of slack whereby said bending and flexing is permitted.

References Cited in the file of this patent

UNITED STATES PATENTS

| | | |
|---|---|---|
| 1,777,004 | Lemere et al. | Sept. 30, 1930 |
| 1,846,538 | Albers et al. | Feb. 23, 1932 |
| 1,889,707 | Soltis et al. | Nov. 29, 1932 |
| 1,961,378 | Mitchell | June 5, 1934 |
| 2,000,954 | Hopkins | May 14, 1935 |
| 2,102,739 | Peters | Dec. 21, 1937 |
| 2,316,048 | Clarke | Apr. 6, 1943 |
| 2,563,522 | Fisher | Aug. 7, 1951 |
| 2,572,608 | Garbo | Oct. 23, 1951 |
| 2,718,668 | Burke | Sept. 27, 1955 |

FOREIGN PATENTS

| | | |
|---|---|---|
| 118,500 | Sweden | Apr. 1, 1947 |
| 852,064 | France | Oct. 16, 1939 |